United States Patent [19]

Adini

[11] Patent Number: 5,116,175

[45] Date of Patent: May 26, 1992

[54] EXPLOSIVELY DEFORMABLE ANCHORING ASSEMBLY

[76] Inventor: Ari Adini, 104-20 Queens Blvd., Forest Hills, N.Y. 11375

[21] Appl. No.: 657,525

[22] Filed: Feb. 19, 1991

[51] Int. Cl.⁵ .............................................. F16B 13/04
[52] U.S. Cl. ......................................... 411/20; 411/440
[58] Field of Search ..................... 411/501, 440, 19, 20

[56] References Cited

U.S. PATENT DOCUMENTS

| | | | |
|---|---|---|---|
| 169,734 | 11/1875 | Schalck | 411/440 X |
| 1,400,401 | 12/1921 | Allan | 411/501 X |
| 2,378,118 | 6/1945 | Widrich | 411/20 |
| 4,271,747 | 6/1981 | Bendler et al. | 411/20 |
| 4,909,686 | 3/1990 | Bender et al. | 411/20 |

FOREIGN PATENT DOCUMENTS

| | | | |
|---|---|---|---|
| 537856 | 5/1955 | Belgium | 411/20 |
| 1181139 | 11/1964 | Fed. Rep. of Germany | 411/440 |

*Primary Examiner*—Rodney M. Lindsey
*Attorney, Agent, or Firm*—Cohen, Pontani, Lieberman & Pavane

[57] ABSTRACT

An anchoring assembly for attachment to a base material having a body with a hollow insertion portion with an open end and an expandable portion positioned behind said open end, an explosive cartridge movably housed within said insertion portion near to said open end and capable of moving from said insertion portion to said expandable portion when forces are applied thereto, and a firing pin housed within said body behind said cartridge for igniting said cartridge when said cartridge is moved from said insertion portion to said expandable portion, upon ignition causing an explosive discharge which outwardly deforms said expandable mid-section against said base material. Such assemblies provide anchorage to remote objects, when shot from a gun or rifle, and allow for attachment of ropes, hooks, ladders and other devices for firemen or mountain climbers.

20 Claims, 1 Drawing Sheet

EXPLOSIVELY DEFORMABLE ANCHORING ASSEMBLY

FIELD OF THE INVENTION

The present invention relates to an anchoring assembly thrust or driven into a base material, like a dry wall, plaster, sheet rock, stone, concrete or similar material by a hammer or by propulsive force imparted to the assembly by a screw gun, nail gun or other power-driven device, and more specifically to an explosively deformable anchoring assembly that expands after insertion into the base material to thereby prevent removal of the device from the base material, and provides for both the distribution of loads therethrough and into the base material as well as the attachment of retaining devices like screws, nails, or ropes to the base material.

BACKGROUND OF THE INVENTION

Anchoring assemblies provide points of structural attachment between multiple load-bearing members like beams, or a member to a base material like a cornice to a wall, sheet rock to a beam, or load-bearing metal (steel) beams to hard surfaces (stone or concrete). Certain assemblies also possess terminal segments that protrude from an anchorage surface of the base material into which a screw or hook can be inserted for rigid connection to the anchorage surface in applications involving, for example, the hanging of items like picture frames. These anchoring assemblies comprise a forward or insertion portion that is embedded in the base material or first member and a terminal portion that protrudes from the base material or first member or is embedded in a second member.

There are numerous types of structural anchors known in the art. For example, in light-load applications, the familiar "molley" or "butterfly" requires the drilling of a hole into or through the base material, followed by the insertion of a first portion into the hole, like the flexible expansion retainer of the molley, or through the hole, like the rigid, folded wings of the butterfly which unfold after they pass through the base material into the air space behind it to create a load bearing surface. In these devices, a second portion, typically comprising a screw, is then inserted. Turning of the screw in the flexible retainer of the molley expands the retainer thereby providing frictional resistance against the matrix material of the base material. As the screw is tightened in the butterfly, the expanded wings are pulled against the back of the anchorage surface thereby creating a load supporting surface.

These devices, however, possess a number of drawbacks, including the requirement to first drill a hole prior to use, inability to handle large loads without becoming cumbersome in size, difficulty in use when the base material is hard or dense, and the absolute incapacity to be used in remote locations where the workman cannot reach, touch, size or drill the base material.

With respect to hard or dense base materials, like stone or concrete, or in industrial applications where heavy loads are to be supported, there are generally two groups of anchorage assemblies. The first group consists of expansion bolts or expansion fasteners which, like the light-load molleys and butterflies, are driven into preformed holes. Expansion anchors typically have a main body with a bore and slots at a forward end and a conical plug which is loosely inserted into the bore at the terminal end. When the forward end of the expansion anchor is driven into the hole, the conical plug is also driven beyond the terminal end into the forward end. The pressure of the conical plug against the sides of the forward and terminal ends cause the sides to expand and press into the periphery of the hole. The mechanical resistance of the expansion anchor to pullout is directly proportional to the frictional forces and lateral pressure of the expanded ends against the periphery of the hole. In certain circumstances, the mechanical resistance can be improved by the provision of a sealed connection of an epoxy material at the interface between the anchor and the base material. However, these devices present the same drawbacks as the light-load molleys and butterflies.

The second group of anchoring assemblies used for dense base materials are power-driven, typically involving nail guns, wherein the anchoring assembly is comprised of a durable and rigid material in the shape of a nail, which is forced into the base material either by mechanical or ballistic propulsion. The tip of the nail is usually placed directly against the target area of the base material, so that the kinetic energy created by the gases from the explosion are converted directly into the mechanical work of penetration. However, these devices are unusable for remote targets, that is, where the base material is inaccessible, since they require contact between the base material and the tip of the anchor prior to use.

Other information regarding the present state of the art can be found in certain commercial publications, such as RED HEAD by ITT Philips Drill Division, Rawlplug Co., Drillco Devices and Hilti Fastening Systems. Additional information on fasteners can also be found in ASTM Publications, such as A490, D1761, and on epoxy in C884-83. However, none of these references solve the problem of anchorage to an inaccessible base material, or utilization of kinetic energy from ballistic propulsion to drive an anchoring assembly a distance before reaching a target on the base material. Such an anchoring assembly could assist mountain climbers, firemen, and the like who must scale surfaces, typically without the time or ability to effect anchorage to the surfaces.

It is, therefore, an object of the present invention to provide an anchoring assembly that that can be used in all load applications and for all base materials.

It is yet a further object of the present invention to provide an anchoring assembly that can be fastened to the base material from a distance.

It is still another object of the present invention to provide an anchoring assembly that is deformable by way of a self-contained explosive charge, detonated after penetration into the base material.

It is still a further object of the present invention to provide a ballistically propelled, explosively deformable anchoring assembly that can be launched at the base material at a distance therefrom, to enable anchorage to a remote or inaccessible base material.

SUMMARY OF THE INVENTION

The foregoing objects, and other objects of the instant invention are achieved by the provision of an anchoring assembly for attachment to a base material, comprising a body having a hollow insertion portion with an open end and an expandable portion positioned behind said open end, an explosive cartridge movably housed within said insertion portion near to said open end and capable of moving from said insertion portion to said expandable portion when forces are applied thereto, and firing means housed within said body behind said cartridge for igniting said cartridge when said cartridge is moved from said insertion portion to said expandable portion and to thereby cause an explosive discharge which outwardly deforms said expandable mid-section against said base material.

Other embodiments include a projectile-like conformation of the body of the assembly and aerodynamic fins or wings attached to the back of the assembly for assistance in flight after ballistic discharge from a conventional weapon, certain types of explosive components, the addition of epoxy or other adhesive materials to the interface between the body and the base material after impact, and further aspects, as set forth below.

It is, therefore, a feature of the present invention to provide an explosively deformable anchoring assembly for attachment to a base material.

It is a further feature of the present invention to provide for a ballistically dischargeable anchorage assembly for applications where the base material is remote or inaccessible, where a ballistic discharge propels the assembly at a target, the assembly penetrates the target, and, after penetration, an explosive discharge causes outward, radial deformation of the assembly creating frictional engagement with the base material.

It is still a further feature of the instant invention that said ballistic anchoring assembly that can be shot from a conventional weapon at a target, and provide rigid anchorage at the target for climbing or supporting of structures upon the target.

BRIEF DESCRIPTION OF THE DRAWINGS

Other objects and many of the attendant advantages and features of the present invention will be readily appreciated and better understood by reference to the following detailed description when considered in connection with the accompanying drawings wherein like reference numerals designate like parts throughout the figures thereof, and wherein.

DETAILED DESCRIPTION OF THE PREFERRED EMBODIMENTS

Figure 1:
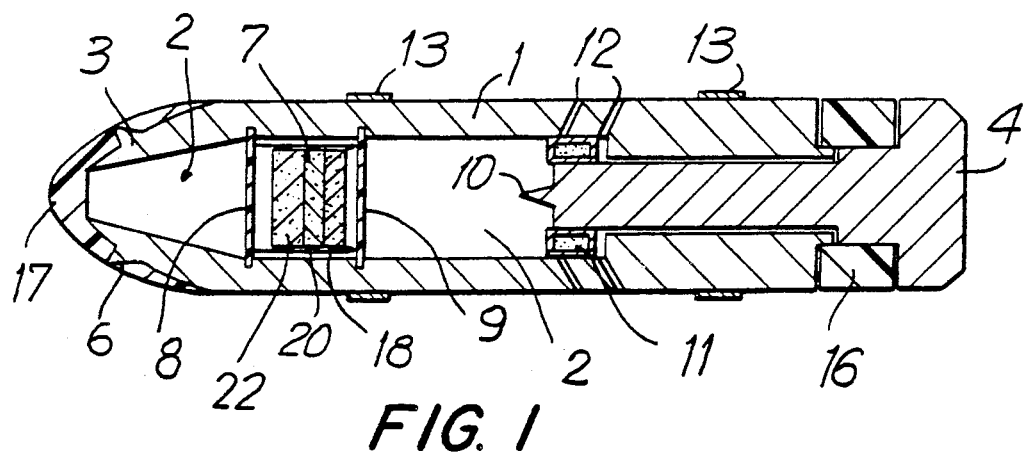
FIG. 1 is a cross-sectional view of the ballistically propelled, explosively deformable anchoring assembly of the present invention.

In FIG. 1, anchoring assembly 1 is shaped cylindrically in accordance with a preferred embodiment of the instant invention as a projectile having a partial bore 2, an ogival nose 3 covered by a plastic cap 17 for penetration, and a cylindrically shaped rear section 4 into which a load retaining screw or other device may be inserted, or over which a rope 5 (shown in FIG. 2) or other means may be placed for load retention once the assembly is fully locked to a base material. Plastic cap 17 may be discarded immediately prior to use of assembly 1, or shed upon impact, as further explained below. Likewise, aerodynamic rear closure 16 is fitted around rear section 4, and comprises a plastic or other light weight material which assists in providing aerodynamic stability to the assembly 1 during its flight to the targeted base material. It is understood that other shapes and structures of the assembly may be utilized without deviating from the scope of the invention.

Ogival surface 3 can be comprised of an exceptionally tough or resilient material that does not deform upon impact with the target, such as tungsten, which is mountedly connected to the forward section of the cylindrical main body 1, and reinforced with a backing ring 6. Ring 6 may also assist in penetration of the target.

A cartridge 7 containing a complete detonation chain is fitted in the forward section of the open bore 2 in the cylindrical body of anchoring assembly 1, just behind the conical cavity, and retained in position by way of diaphragms 8 and 9 at each end of the cartridge. A space is provided behind the rear diaphragm 9 in bore 2, after which a firing pin 10 is positioned at the end of the bore 2, and fixedly attached to the main body 1 either through to the terminal portion 4, as shown, or circumferentially to the interior surface of the bore 2, or by other like means.

A capsule 11 is shown filled with an epoxy or other material, and mounted over the firing pin 10 and in contact with exhaust and expansion holes 12 in the main body of anchor 1. Thin copper rings 13 are firmly attached to the main body 1 in order to facilitate the firing of the anchor from the barrel of a gun, and to impart stabilizing spin during the trajectory toward the target. Likewise, other, further or additional fins, wings or similar aerodynamic stabilizing devices may be added to the periphery of the anchor 1, shown in FIG. 1.

Rear section 4 of assembly 1 can include ballistic propulsion means, allowing for the firing of the assembly 1 from a rifle, handgun, or other weapon, and providing projectile trajectory towards a target on the base material. In operation, such an embodiment would allow a fireman or mountain climber the safety ability to attach one or more anchoring assemblies 1 to walls or other structures, to string safety nets, pinions, hooks, ladders, ropes or other devices from said assemblies, without first having to drill a hole and plant a traditional anchoring tool. These advantages are nowhere attainable in the prior art, and are directly linked to the elements and features of the instant invention.

Figure 2:
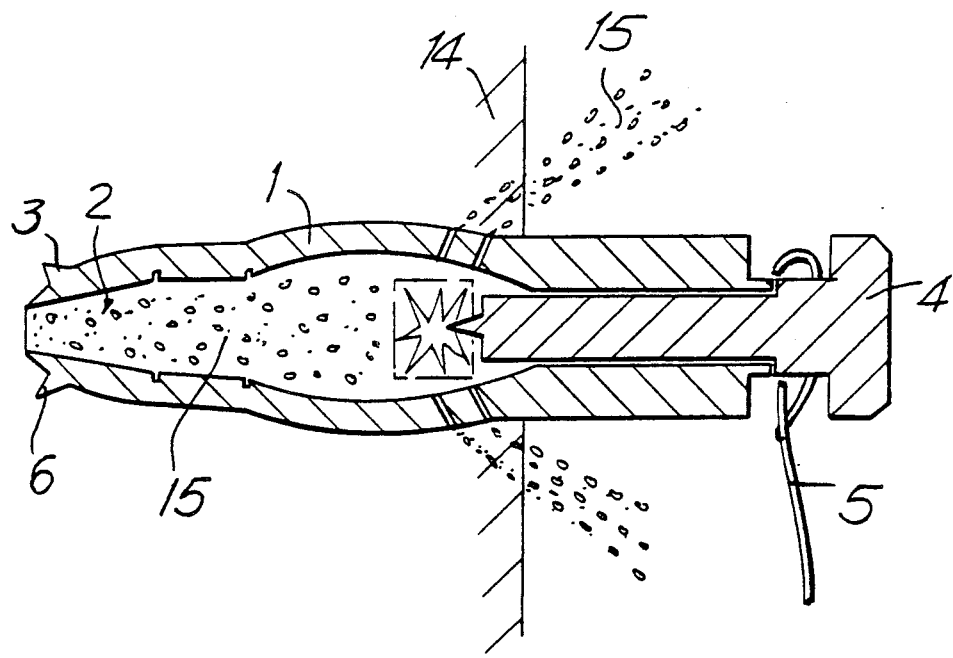
FIG. 2 is a cross-sectional view of the anchoring assembly of FIG. 1 after penetration and detonation of the explosive charge.

FIG. 2 shows the anchoring assembly 1 of FIG. 1 after impact with the base material 14 of the target. Upon impact with the target object 14, a stream of particles 15 is forced or ejected from the hole formed in the material 14. Likewise, as the forward section of the assembly 1 strikes the target, plastic cap 17 is immediately shed (or may be removed before firing, if necessary) and ogival-like nose 3 with ring 6 penetrates the target, causing some of the base material 14 to be forced into the bore 2 as a stream 15. This stream 15 entering the bore 2 ruptures the diaphragm 8, and pushes the cartridge 7 towards contact with the firing pin 10, which in turn ruptures the rear diaphragm 9 of the cartridge 7, whereupon the firing pin 10 ignites an initiating charge 18 which ignites a delay charge 20. At the end of this time delay, the main charge 22 detonates, raising the pressure inside the bore 2, and forcing the walls of the body 1 to radially deform outwardly, forcing the epoxy from capsule 11 through the perforations 12, and shedding the temporary rear closure 16, provided to assist the assembly during its flight. The delay charge allows for penetration before explosive expansion to ensure locking of the assembly to the target. It is also understood to be within the scope of the invention to fill a portion of the partial void 2 with an encapsulated non-compressable fluid material (like an epoxy in a gelatinous coating) that fits firmly against the enclosure 17 such that upon contact of enclosure 17 or a portion of the capsule, compression is caused, moving the cartridge 7 against the firing pin 10. In this manner, the instant invention can be used with pre-formed holes, and if the charge is light enough, secured in place by a simple swing of a hammer.

Accordingly, while there have been shown, described and pointed out the fundamental novel features of the invention as applied to a preferred embodiment thereof, it will be understood that various omissions, substitutions and changes in the form and details of the device illustrated and in its operation may be made by those skilled in the art without departing from the spirit of the invention. It is the intention, therefore, to be the limited only as indicated by the scope of the claims appended hereto.

I claim:

1. An anchoring assembly for attachment to a base material, comprising:
   a body having a forward section and a hollow insertion portion with an open end and an expandable portion positioned behind said open end;
   an explosive cartridge movably housed within said insertion portion near to said open end and capable of moving from said insertion portion to said expandable portion when forces are applied thereto; and
   firing means housed within said body behind said cartridge for igniting said cartridge when said cartridge is moved from said insertion portion to said expandable portion, upon ignition causing an explosive discharge which outwardly deforms said expandable portion against said base material.

2. The assembly of claim 1, wherein said open end is ogival in shape.

3. The assembly of claim 1, wherein said open end is capped with a resilient material that is shedable upon impact with said base material.

4. The assembly of claim 1, wherein said body is projectile-shaped.

5. The assembly of claim 1, wherein said cartridge comprises ignition, delay and detonating components.

6. The assembly of claim 1, wherein said firing means comprises a firing pin which, when contacted against said cartridge results in a detonation chain.

7. The assembly of claim 1, further comprising time delay means for delaying explosion after contact between said firing means and said cartridge.

8. The assembly of claim 1, further comprising an adhesive discharge means for discharging adhesive between said body and said base material after penetration.

9. The assembly of claim 1, wherein said forward portion possesses a curved contour broken by a step-like reinforcing ring.

10. The assembly of claim 1, further comprising a shaped trailing end behind said expandable portion.

11. The assembly of claim 10, wherein said shaped trailing end further comprises operative engagement means for engaging external devices.

12. The assembly of claim 11, wherein said external devices are ropes.

13. The assembly of claim 11, wherein said external devices are hooks.

14. The assembly of claim 1, wherein said explosive cartridge is retained in said body by retaining means for preventing the premature lateral displacement of said cartridge.

15. The assembly of claim 14, wherein said retaining means comprises at least one diaphragm.

16. The assembly of claim 1, further comprising stream lining means for providing aerodynamic balance and direction when launching at a distance from said base material.

17. The assembly of claim 1, further comprising ballistic propulsion means for shooting said body as a projectile at said base material.

18. The assembly of claim 8, wherein said adhesive discharge means comprises a capsule which ruptures under said explosive discharge, epoxy material contained in said capsule, and ejection conduits in the periphery of said body through which said epoxy is forced after penetration.

19. The assembly of claim 1, wherein said open end receives pieces of the base material upon insertion of said assembly into said material, and said pieces force the movement of said cartridge against said firing means.

20. The assembly of claim 1, further comprising metal ring means attached to the periphery of said body to provide for ballistic discharge from a conventional weapon.

* * * * *